Figure 1:
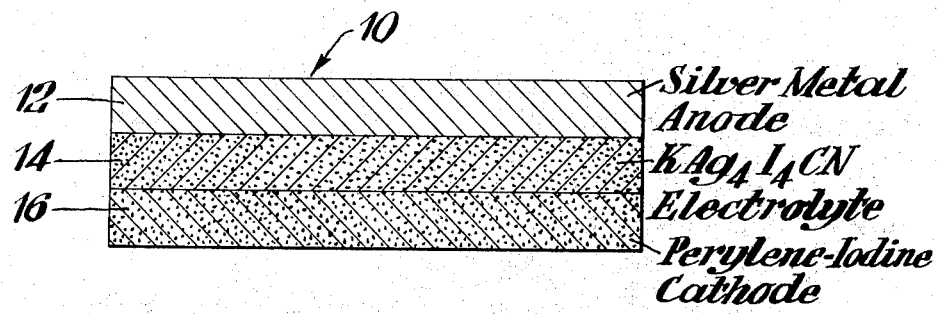

United States Patent
Louzos

[15] 3,653,968
[45] Apr. 4, 1972

[54] SOLID STATE ELECTROCHEMICAL CELLS

[72] Inventor: Demetrios Vasilios Louzos, Rocky River, Ohio

[73] Assignee: Union Carbide Corporation, New York, N.Y.

[22] Filed: May 4, 1970

[21] Appl. No.: 34,442

[52] U.S. Cl. .................................... 136/83 R, 136/153
[51] Int. Cl. .................................................... H01m 21/00
[58] Field of Search .................... 136/83, 6, 20, 23, 153

[56] References Cited

UNITED STATES PATENTS

| | | | |
|---|---|---|---|
| 3,476,605 | 11/1969 | Owens | 136/83 R |
| 3,476,606 | 11/1969 | Owens | 136/83 R |
| 3,443,997 | 5/1969 | Argue et al. | 136/83 R |

FOREIGN PATENTS OR APPLICATIONS

| | | |
|---|---|---|
| 1,140,398 | 1/1969 | Great Britain |

*Primary Examiner*—Winston A. Douglas
*Assistant Examiner*—C. F. Lefevour
*Attorney*—Paul A. Rose, John F. Hohmann, John R. Doherty and Michael A. Caputo

[57] ABSTRACT

A solid state electrochemical cell having a silver or copper anode, an iodine containing cathode and an electrolyte of the general formula $$MCN \cdot 4AgI$$

wherein M is potassium, rubidium or cesium O a mixture thereof.

19 Claims, 2 Drawing Figures

Patented April 4, 1972

3,653,968

INVENTOR
Demetrios V. Louzos
BY Michael A. Caputo
ATTORNEY

SOLID STATE ELECTROCHEMICAL CELLS

This invention relates to solid state electrochemical cells, as well as solid state batteries comprising an assembly of such cells.

The vast majority of electrochemical cells presently in use are aqueous systems and are dependent upon the flow of ions through an aqueous solution of metallic salts. In the so-called "dry cell" the aqueous solution is immobilized in a paste or gelled mixture to overcome the difficulties associated with handling and packaging a liquid. However, even after immobilization, the system is still subject to possible leakage, has a limited shelf life due to drying out or crystallization of the salts, and is suitable for use only within a limited temperature range corresponding to the liquid range of the electrolyte. In addition, the necessity of including a large volume of immobilizing material has hindered the aims of miniaturization.

Solid state electrochemical devices, i.e., those comprising components which are normally solids at ambient temperature, have been known to the art for several years. However, these cells have not achieved widespread use either because of their low power output or the sensitivity of the various components to moisture.

The low power output of these cells is due primarily to the low specific conductances of the various components. Most solids have specific conductances at room temperature (20° C.) in the range of $10^{-6}$ to $10^{-5}$ ohm$^{-1}$ cm$^{-1}$ as compared to aqueous solutions of salts which nominally have a specific conductance of 0.5 to 0.8 ohm$^{-1}$ cm$^{-1}$.

The sensitivity of the cells to moisture is due primarily to the reactivity and degradation of the solid electrolyte in the presence of water, even the moisture contained in the atmosphere.

U.S. Pat. application Ser. No. 805,002, filed Mar. 6, 1969, by G. W. Mellors, now abandoned, describes novel compounds and mixtures of compounds which are solid ionic conductors at room temperature and have specific conductances sufficiently high to permit their use in practical battery applications. In addition, many of these compounds are less sensitive to moisture than those which have previously been available.

It has now been found that the combination of a silver or copper anode with the electrolytes of U.S. Pat. application Ser. No. 805,002 and specific solid iodine containing compounds having at least a fraction of an iodine atom at a valence of zero as a cathode yield solid state cells which display good shelf life stability and are powerful enough for practical battery applications.

Figure 2:
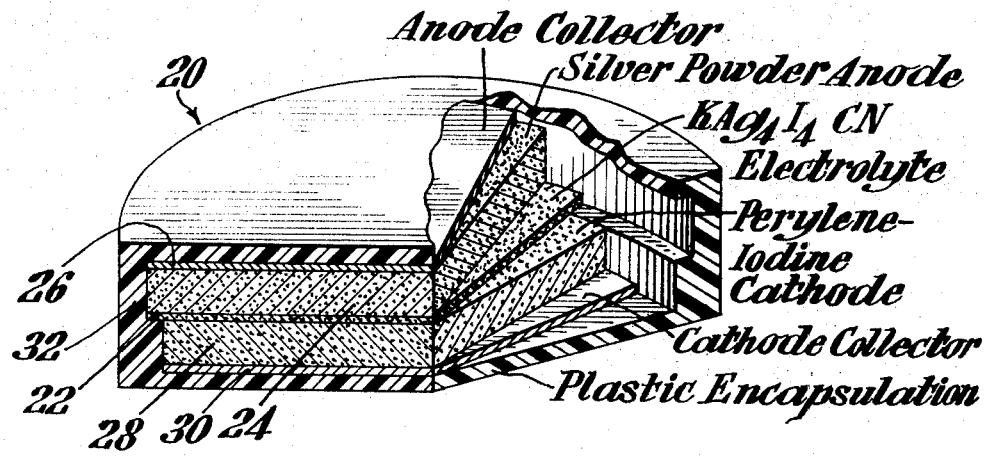

The invention will be more particularly described with reference to the accompanying drawings in which:

FIG. 1 is a cross-sectional view of an idealized solid state cell in accordance with the present invention; and FIG. 2 is a cross-sectional view, partially cut-away, of a preferred packaged solid state cell in accordance with the invention.

Referring in more detail to FIG. 1, there is shown a solid state cell, generally designated 10, formed of three layers, an anode 12, an electrolyte layer 14 and a cathode 16, each shown in nonscaler, simplified form. The anode 12, in the simplest embodiment of the invention, is a layer of metallic silver which may be a thin sheet of silver foil or a thin layer of silver metal deposited on one side of electrolyte layer 14. The electrolyte layer 14 is a thin disc formed by compressing powdered electrolyte, e.g., monopotassium tetrasilver tetraiodide monocyanide (KAg$_4$I$_4$CN). The cathode 16 is also a pressed powder disc formed from an iodine containing compound or complex, e.g., 2 perylene · 3 iodine. The three layers of cell 10 are held together by intimate contact between the particles at the interfaces between the various layers which is achieved by compression at the time of manufacture. Thereafter, the cell will function without external pressure being applied.

To operate cell 10 it is merely necessary to make electrical contact to the anode 12 and the cathode 16. If desired, several cells can be formed into a stack in the conventional manner and electrical contact would be made to the anode and cathode at opposite ends of the stack.

FIG. 2 shows a more refined cells construction employing additional parts, but the basic components of this cell, generally designated 20, will function in much the same manner as the three layers of the simplified cell of FIG. 1. Cell 20 comprises an electrolyte layer 22, which is identical to electrolyte layer 14 of cell 10, having an anode assembly on one side thereof and a cathode assembly on the other side thereof.

The anode assembly comprises a disc which is a pressed silver powder anode 24 adjacent the electrolyte layer 22 and an anode collector 26 on the outside surface of anode 24. The collector can be any compatible electrically conductive material, e.g., silver metal foil.

The cathode assembly comprises a disc which is an iodine containing pressed powder cathode 28, e.g., 2 perylene · 3 iodine complex having a metallic cathode collector 30, e.g., a thin sheet of nickel, on its outer surface.

The entire cell assembly is compressed during manufacture to establish good electrical contact and a physical bond between the various layers and the cell is thereafter encapsulated in plastic 32 to form a sealed unit cell. The layers of plastic covering the anode collector 26 and cathode collector 20 may be punctured (not shown) to allow external contact to be made with the cell, e.g., by filling the punctures with a conductive epoxy sealer.

Each of the cell components and their method of manufacture will be described in greater detail in the ensuing discussion.

THE ANODE

The choice of an anode for a solid state battery is dependent upon the mechanism through which the solid electrolyte operates. The electrolytes of the present invention conduct primarily through transport of metal ions and the only metal ions which are transported at a sufficient rate to be useful in electrochemical cells are silver and copper. For this reason the only anodes useful in cells of the present invention are those containing silver or copper.

The anode metal may be present as a thin metal foil or layer of metal deposited on the electrolyte or may be a compressed layer of the powdered metal. Preferably, the pressed powder layer is used since it provides a larger surface area at the anode-electrolyte interface, permits more intimate contact between the anode and electrolyte layers when pressed together, and permits the incorporation into the anode layer of particles of electrolyte, binder or carbon which have all been shown to improve cell performance.

A preferred anode mixture can be prepared from silver powder mixed with powdered electrolyte, acetylene black and graphite. These components are first dried over phosphorus pentaoxide in a nitrogen atmosphere and mixed to form a uniform composition. A typical preferred formulation would be 0.70 gram silver powder, 0.15 gram electrolyte, 0.05 gram graphite and 0.001 gram acetylene black.

It has been found that by using a fine silver powder the capacity of the cell is substantially increased. This improved performance is probably due to the resulting increased surface area of the anode-electrolyte interface. It has been found, for example, that by using silver powder of 0.9-1.4 micron in diameter the capacity of the cell is 2½ times greater than that of a cell using 5-8 micron silver powder. The most preferred silver powder has a discrete particle size in the range of 0.9-1.4 micron.

For certain applications a large cell capacity is not required and the amount of silver or copper in the anode may be kept to a minimum to reduce the cost of the cell. In such instances it has been found desirable to employ an anode comprising a thin coat of silver or copper on a substrate, e.g., a high surface area graphite and/or acetylene black substrate.

The silver or copper may conveniently be adhered to the substrate by vacuum deposition followed by compression. Cells employing such anodes would be suitable for photoflash applications where only minute components of silver are needed but high surface area development is also required.

A thin high surface area silver anode can also be produced by actinically reducing the surface of the silver-containing electrolyte. For example, a layer of monopotassium tetrasilver tetraiodide monocyanide ($KAg_4I_4CN$) was exposed to light and used to fabricate a cell. The performance of this cell equalled that of cells having a layer of silver powder of 1-micron particle size in their anode formulations.

While the above describes the most preferred methods of forming the anode of cells of the present invention, it will be obvious to those skilled in the art that various other methods can be used to prepare suitable anodes. Among these is painting a solution of silver or copper in a non-aqueous volatile solvent on the electrolyte surface and thereafter evaporating the solvent.

The only requirement for a useful anode is that silver or copper metal be in electrical contact with one side of the electrolyte layer.

THE ELECTROLYTE

In general, solid electrolytes useful in the cells of the present invention conform to the general formula $$MCN \cdot 4AgI$$

wherein M is potassium, rubidium or cesium or a mixture thereof. The MCN component of the formula may be, therefore, potassium cyanide, rubidium cyanide or cesium cyanide alone or in any combination so long as the mole ratio of total alkali cyanide to silver iodide is 1:4. Illustrative of these compounds are $KCN \cdot 4AgI$, $RbCN \cdot 4AgI$, $CsCN \cdot 4AgI$, $K_{1/2}Rb_{1/2}CN \cdot 4AgI$, $Cs_{1/2}K_{1/2}CN \cdot 4AgI$, $Rb_{1/2}Cs_{1/2}CN \cdot 4AgI$, and $Rb_{1/3}K_{1/3}Cs_{1/3} \cdot 4AgI$ which may be formally written $KAg_4I_4CN$, $RbAg_4I_4CN$, $CsAg_4I_4N$, $KRbAg_8I_8(CN)_2$, $CsKAg_8I_8(CN)_2$, $RbCsAg_8I_8(CN)_2$ and $RbKCsAg_{12}I_{12}(CN)_3$, respectively, and descriptively named potassium tetrasilver tetraiodide monocyanide, monorubidium tetrasilver tetraiodide monocyanide, monocesium tetrasilver tetraiodide monocyanide, monorubidium monopotassium octosilver octoiodide dicyanide, monocesium monopotassium octosilver octoiodide dicyanide, monorubidium monocesium octosilver octoiodide dicyanide and monorubidium monopotassium monocesium dodecasilver dodecaiodide tricyanide, respectively.

The ionic conductivity of these compounds greatly exceeds that of silver iodide alone. The specific conductance of monopotassium tetrasilver tetraiodide monocyanide at 25° C. is $1.4 \times 10^{-1}$ $ohm^{-1}$ $cm^{-1}$; that of monorubidium tetrasilver tetraiodide monocyanide is $1.8 \times 10^{-1}$; that of monocesium tetrasilver tetraiodide monocyanide is $9.1 \times 10^{-4}$ $ohm^{-1}$ $cm^{-1}$; and that of monopotassium monorubidium octosilver octoiodide dicyanide is $1.5 \times 10^{-1}$ $ohm^{-1}$ $cm^{-1}$. The specific conductance of silver iodide at 25° C. is approximately $10^{-6}$ $ohm^{-1}$ $cm^{-1}$. In addition, the presence of cyanide molecules in the compound increases the stability of the compounds over the pure silver iodide solid conductors, particularly with respect to stability in moist atmosphere conditions at or near room temperature. Moreover, the physical and electrochemical properties of the compounds can be modified by forming solid solutions of the compounds with each other or with one or more of the elements contained in the compound. For example, if we consider modifications of the compound monopotassium tetrasilver tetraiodide monocyanide as falling within a ternary diagram of silver iodide, potassium cyanide and silver cyanide, it appears that compositions along lines originating at the silver iodide vertex contain conducting materials with maximum conductance at about 80 mole per cent silver iodide. Generally speaking, compositions along the silver iodide-silver cyanide binary are of minute conductance and the conductance of these compositions increases upon addition of potassium cyanide. Maximum conductance and the formation of the novel compounds according to the invention is achieved at a ratio of total alkali cyanide to silver iodide of 1:4. However, as will become clear from the ensuing disclosure, compositions which are modifications of the 1:4 ratio have specific conductances sufficiently high to permit their use in special battery applications. Suitable electrolytes are obtained within the range of alkali cyanide to silver iodide of from 1:19 to 1:1. Typical specific conductances obtained by modifications of monopotassium tetrasilver tetraiodide monocyanide within the ternary described above are set forth in the following table:

TABLE 1

| Compositions | Specific Conductance (25° C.) |
|---|---|
| $2AgI-KAg(CN)_2$ | $2.9 \times 10^{-2}$ $ohm^{-1}$ $cm^{-1}$ |
| $3AgI-KAg(CN)_2$ | $6.7 \times 10^{-2}$ $ohm^{-1}$ $cm^{-1}$ |
| $4AgI-KAg(CN)_2$ | $1.2 \times 10^{-1}$ $ohm^{-1}$ $cm^{-1}$ |
| $9AgI-KAg(CN)_2$ | $3.98 \times 10^{-2}$ $ohm^{-1}$ $cm^{-1}$ |
| $19AgI-KAg(CN)_2$ | $4.5 \times 10^{-3}$ $ohm^{-1}$ $cm^{-1}$ |

As can be seen from this table the specific conductance of various compositions can be modified by changing the proportion of silver iodide present while maintaining the proportions of potassium cyanide and silver cyanide constant in a 1:1 mole ratio. The specific conductance of compositions falling along the silver iodide-potassium cyanide axis of the ternary further demonstrates the flexibility of this system as is exemplified by the following table:

TABLE 2

| Composition (mole per cent) | | Specific Conductance ($ohm^{-1}$ $cm^{-1}$ at 25° C.) |
|---|---|---|
| AgI | KCN | |
| 95 | 5 | $2.9 \times 10^{-3}$ |
| 90 | 10 | $3.20 \times 10^{-2}$ |
| 82.5 | 17.5 | $9.5 \times 10^{-2}$ |
| 80 | 20 | $1.40 \times 10^{-1}$ |
| 75 | 25 | $9.34 \times 10^{-2}$ |
| 70 | 30 | $6.31 \times 10^{-2}$ |
| 65 | 35 | $4.10 \times 10^{-2}$ |
| 62.5 | 37.5 | $3.62 \times 10^{-2}$ |
| 60 | 40 | $3.23 \times 10^{-2}$ |
| 55 | 45 | $1.00 \times 10^{-2}$ |
| 50 | 50 | $3.5 \times 10^{-3}$ |

In general, compositions in the ternary diagram of silver iodide, potassium cyanide and silver cyanide which exhibit specific conductances sufficiently high to permit use in the cells of the present invention conform to the compositions expressed by the formula:

$$xAgI-yKCN-zAgCN$$

wherein $x$ ranges from 0.45 to 0.95 mole, $y$ is 1 minus $x$ mole and the ratio of $y/z$ ranges from infinity to 1, or wherein $x$ ranges from 0.45 to 0.95 mole, $z$ is 1 minus $x$ mole and the ratio $y/z$ ranges from 1 to 1/9. For example, if $x$ is 0.80 mole, $y$ is 0.20 mole and $y/z$ is infinity, the composition $4AgI-KCN$ is expressed. Also, when $x$ is 0.80 mole, $y$ is 0.20 mole and $y/z$ is 1, the composition $4AgI-KAg(CN)_2$ is expressed. Likewise, when $x$ is 0.50 mole, $z$ is 0.50 mole and $y/z$ is 1/5 the composition $5AgI-4AgCN-KAg(CN)_2$ is obtained. In the preferred compositions $x$ is 0.80 mole and $y/z$ ranges from infinity to 1.

The relations expressed in the formula set forth above are also true for the monorubidium and monocesium salts in which instances the $y$ term of the formula would be rubidium cyanide or cesium cyanide, respectively. The numerical values expressed for the potassium salt are also correct for the rubidium and cesium salts.

These compounds are particularly well suited for use as solid state cell electrolytes since they readily transport silver ions and have specific conductances sufficiently high to permit fabrication of batteries having voltages and currents within the ranges of batteries having voltages and currents required for practical use. The compounds are also more stable than compounds which have heretofore been available.

The methods of preparing the various solid electrolytes and their physical properties are given in greater detail in U.S. Pat. application Ser. No. 805,002.

THE CATHODE

Cathode materials useful in the cells of the present invention are those compounds or complexes of iodine which have at least a fraction of an iodine atom at a valence of zero. Particularly useful are the so-called polyhalides of iodine and charge transfer complexes containing iodine.

Polyhalides are complex halides having a halogen atom as the central atom of the anion. They can be organic or inorganic salts and have been made up to the ennea-iodine $M[I_9]$. Examples of polyhalides useful as cathode materials in the cell of the present invention are: iodine complexes with metals such as cesium, potassium and rubidium, iodine complexes with polycyclic aromatic compounds such as napthalene, anthracene, pyrene and violanthrene; iodine complexes and heterocyclic aromatic compounds containing hetero atoms such as nitrogen or sulfur, e.g., acridine, phenazine, melamine, morpholine and pyridine; cyclic aromatic hydrocarbons containing one or more electron donating substituents such as alkyl, alkoxy, amino, dimethylamino or tetramethylammonium groups; amine triiodides such as benzylamine or dibenzylamine; quaternaryammonium polyhalides; ethylene diamine triiodide; and tetramethylphosphonium triiodide.

Particularly useful polyhalides are cesium triiodide, potassium triiodide, rubidium triiodide, cesium pentaiodide, cesium ennea-iodide, tetramethylammonium triiodide, tetramethyammonium pentaiodide, tetramethylammonium ennea-iodide, tetramethylammonium monobromodide, tetramethylammonium monobromotetraiodide tetraethylammonium triiodide and tetrabutylammonium pentaiodide.

The second general class of materials suitable as cathode materials for cells in accordance with the present invention are the so-called charge transfer complexes. These complexes consist of a donor which is an organic compound, usually aromatic or heterocyclic, and an acceptor which is a halogen, specifically, iodine. Suitable donor compounds include: perylene, pyrene, naphthalene, phenothiazine, phenazine, anthracene, violanthrene, acridine, dimethylanthracene, diaminopyrene, and tetramethylbenzidine. The perylene-iodine and phenothiazine-iodine complexes are particularly preferred and include such complexes as: perylene $I_2$, 2 perylene · $3I_2$, perylene · $2I_2$, phenothiazine · $I_2$, 2 phenothiazine · $3I_2$, phenothiazine · $2I_2$ and perylene · $1/4I_2$.

There is some overlap in the two general classes of cathode materials recited above since some of the polyhalogens are also charged transfer complexes. Both classes are equally useful in the cells of the present invention.

cathode material may be powdered and compressed alone but preferably is compounded in much the same manner as the anode, i.e., starting with the dried powder form of the active cathode material, electrolyte, graphite and acetylene black and physically mixing these together. A typical preferred formulation would be 1.0 gram cathode material, 2.0 grams electrolyte, 0.6 gram graphite, and 0.01 gram acetylene black.

CELL CONSTRUCTION

In general, the method of preparing the solid state cells of the present invention comprises forming layers of the anode and cathode components with a layer of the electrolyte sandwiched therebetween. Preferably each of the components is a dry powder and all assembly operations, including drying, mixing, electrode and cell assembly, are carried out in a dry box. The use of a dry box having nitrogen, argon or helium atmosphere dried over the phosphorus pentaoxide has produced particularly good results.

It will be obvious to those skilled in the art that various sizes and shapes of cells can be prepared and cell thickness can be varied to achieve maximum results for a particular purpose. In general, the manner of cell assembly will be the same for any size or shape cell. The simplest method of cell assembly merely requires that the desired quantities of anode mix, electrolyte and cathode mix are doctor-bladed as the dry powders in molds with a silver sheet substrate as a collector beneath the anode mix and a nickel sheet collector above the cathode mix. The anode and cathode subassemblies are compressed separately and the subassemblies are then put together with the electrolyte layer therebetween and the entire cell is again compressed. The completed cell is then encapsulated in a protective resin or other potting compound to prevent absorption of moisture by the electrolyte.

Preferred cell constructions in accordance with the present invention will be described in more detail in the following examples which are merely illustrative and are not intended, in any manner, to be limitative of the present invention:

EXAMPLE 1
$Ag/KAg_4I_4CN/2$ Perylene · $3I_2$ Cell

A cell was constructed substantially similar to that shown in FIG. 2. The anode was a mixture of 0.70 gram of silver powder having a discrete particle size in the range of about 0.9 to 1.4 microns, 0.15 gram powdered $KAg_4I_4CN$ electrolyte, 0.05 gram graphite and 0.001 gram acetylene black. These components were individually dried over $P_2O_5$ in a dry box having a nitrogen atmosphere and mixed together in a mortar and pestle. The resulting mixture was then doctor-bladed in a cylindrical mold with a silver sheet substrate as a "collector."

The cathode was fabricated in much the same manner as the anode and was formed from 1.0 gram 2 perylene · $3I_2$, 2.0 grams $KAg_4I_4CN$ electrolyte, 0.6 gram graphite and 0.01 gram acetylene black. After being dried and mixed the powdered cathode mix was doctor-bladed in a cylindrical mold on the nickel sheet substrate.

The electrolyte was 1.1 gram of powdered $KAg_4I_4CN$ compressed into a disc 0.004 inch thick.

Anode, cathode and electrolyte subassemblies were individually compressed and were assembled and again compressed. The entire assembly was then encapsulated in polymerized methyl methacrylate. The completed cell measured 1.0 inch in diameter and 0.1 inch total thickness. Electrical contact with the cell was made by drilling through the methyl methacrylate layers covering the anode and cathode collectors to contact the metal foils.

The cell had an open circuit voltage of 0.64 volt, a flash current of 0.75 amp per square inch and discharge was possible for short periods at 50 milliamperes per square inch.

EXAMPLE 2
$Ag/KAg_4I_4CN/RbI_3$

A cell was fabricated in the manner described in Example 1 except that rubidium triiodide was substituted for the 2 perylene · $3I_2$.

The cathode mix was 0.418 gram of rubidium triiodide, 0.827 gram of $KAg_4I_4CN$ electrolyte, 0.310 gram of graphite, and 0.006 gram of acetylene black. The electrolyte layer was 0.55 gram of $KAg_4I_4CN$. The cathode mix was 0.645 gram of silver powder, 0.826 gram $KAg_4I_4CN$, 0.201 gram graphite and 0.006 gram acetylene black.

The cell had an open circuit voltage of 0.67 volt, a flash current of 0.70 amp per square inch and discharge was possible for short periods at 50 milliamperes per square inch.

EXAMPLE 3
$Cu/KAg_4I_4CN/2$ Perylene · $3I_2$

A cell employing a copper anode was assembled in substantially the manner described in Example 1. The anode mix consisted of 0.645 gram of 100 mesh copper powder, 0.593 gram of $KAg_4I_4CN$ electrolyte, 0.201 gram of graphite and 0.006 gram of acetylene black well mixed and compressed on a copper sheet anode collector. The electrolyte was a compressed layer of 1.1 gram of KAg$_4$I$_4$CN. The cathode mix was 0.323 gram of 2 perylene · 3I$_2$, 0.827 gram of KAg$_4$I$_4$CN electrolyte, 0.310 gram of graphite and 0.006 of acetylene black compressed on a cathode collector of porous nickel.

The open circuit voltage of this cell was 0.603 volt and the cell delivered for a short time 1.9 milliamperes at 0.57 volt on a 300-ohm load and 9.4 milliamperes at 0.47 volt on a 50-ohm load.

EXAMPLE 4
Ag/KAg$_4$I$_4$CN/(CH$_3$)$_4$NI$_3$

A cell was assembled in substantially the manner described in Example 1 using a (CH$_3$)$_4$NI$_3$ cathode. The anode mix was 1.613 gram of silver powder, 1,438 gram of KAg$_4$I$_4$CN electrolyte, 0.503 gram graphite and 0.016 gram acetylene black. The electrolyte was 0.6 gram of KAg$_4$I$_4$CN and the cathode mix was 0.841 gram of (CH$_3$)$_4$NI$_3$, 2.044 gram of KAg$_4$I$_4$CN electrolyte, 0.776 gram of graphite and 0.016 gram of acetylene black.

This cell had an open circuit voltage of 0.65 volt and was capable of operating, for short periods of time, at a current density of 17 milliamperes per square inch. Continuous discharge at 0.15 milliamperes was also obtained.

EXAMPLE 5
Ag/KAg$_4$I$_4$CN/2 Phenothiazine · 3I$_2$

A cell was constructed exactly as described in Example 1 except that 2 phenothiazine · 3I$_2$ was substituted for the 2 perylene · 3I$_2$.

The cell had an open circuit voltage of 0.64 volt and discharged continuously on a 150 microampere load as follows:

TABLE 3

| Time (Hours) | Voltage (Volts) |
|---|---|
| 20 | 0.61 |
| 40 | 0.59 |
| 60 | 0.57 |
| 80 | 0.55 |
| 100 | 0.52 |
| 110 | 0.50 |

EXAMPLE 6
Ag/RbAg$_4$I$_4$CN/2 Perylene · 3I$_2$

A cell was constructed as described in Example 1 with RbAg$_4$I$_4$N substituted for the KAg$_4$I$_4$CN electrolyte contained in the anode mix, electrolyte layer and cathode mix.

The cell had an open circuit voltage of 0.64 volt.

EXAMPLE 7
Ag/RbAg$_4$I$_4$CN/2 Phenothiazine · 3I$_2$

A cell was fabricated as described in Example 5, i.e., having 2 phenothiazine · 3I$_2$ substituted for the 2 perylene · 3I$_2$ of Example 1, and additionally having RbAg$_4$I$_4$CN substituted for the KAg$_4$I$_4$CN electrolyte.

The cell had an open circuit-voltage of 0.64 volt and discharged continuously on a 150 microampere load as follows:

Table 4

| Time (Hours) | Voltage (Volts) |
|---|---|
| 20 | 0.62 |
| 40 | 0.59 |
| 60 | 0.57 |
| 80 | 0.55 |
| 100 | 0.52 |
| 110 | 0.50 |

Various modifications of battery constructions will be obvious to those skilled in the art from the foregoing teachings. For example, other sizes and shapes of batteries could be fabricated from single cells or stacks of cells connected in series or in parallel to meet various applications. In addition each of the components can be used in any of various physical forms or compounds. Moreover, additives to increase conductivity, shelf life or stability in the presence of moisture might also find their place in cells in accordance with the invention. It is not intended therefore, that the details set forth herein shall be construed as limiting the scope of the invention.

What is claimed is:

1. A solid state electrochemical cell comprising a silver or copper anode; a solid, ionically conductive electrolyte which is a compound of the general formula:

MCN · 4AgI wherein M is potassium, rubidium, cesium or a mixture thereof; and a cathode which is a compound or complex of iodine having at least a fraction of an iodine mole at a valence of zero.

2. A solid state electrochemical cell comprising a silver or copper anode; a solid, ionically conductive electrolyte having a composition conforming to the formula:

$x$AgI—$y$MCN—$z$AgCN wherein M is potassium, rubidium, cesium or a mixture thereof, $x$ ranges from 0.45 to 0.95 mole, $y$ is 1 minus $x$ mole, and the ratio of $y/z$ ranges from infinity to 1; and a cathode which is a compound or complex of iodine having at least a fraction of an iodine mole at a valence of zero.

3. A solid state electrochemical cell comprising a silver or copper anode; a solid, ionically conducting electrolyte having a composition conforming to the formula:

$x$AgI—$y$MCN—$z$AgCN wherein M is potassium, rubidium, cesium or a mixture thereof, $x$ ranges from 0.45 to 0.95 mole, $z$ is 1 minus $x$ mole, and the ratio of $y/z$ ranges from 1 to 1/9; and a cathode which is a compound or complex of iodine having at least a fraction of an iodine mole at a valence of zero.

4. A solid state electrochemical cell in accordance with claim 1 wherein the electrolyte is monopotassium tetrasilver tetraiodine monocyanide, monorubidium tetrasilver tetraiodide monocyanide, monocesium tetrasilver tetraiodide monocyanide, monorubidium monopotassium octosilver octoiodide dicyanide, monocesium monopotassium octosilver octoiodide dicyanide, monorubidium monocesium octosilver octoidide dicyanide, monopotassium monorubidium monocesium dodecasilver dodecaiodide tricyanide or a mixture thereof.

5. A solid state electrochemical cell in accordance with claim 1 wherein the cathode is a polyhalide of iodine.

6. A solid state electrochemical cell in accordance with claim 1 wherein the cathode is a charge-transfer complex containing iodine.

7. A solid state electrochemical cell in accordance with claim 1 wherein the anode is silver, the electrolyte is monopotassium tetrasilver tetraiodide monocyanide and the cathode is 2 perylene · 3I$_2$.

8. A solid state electrochemical cell in accordance with claim 1 wherein the anode is silver, the electrolyte is monopotassium tetrasilver tetraiodide monocyanide and the cathode is perylene · I$_2$.

9. A solid state electrochemical cell in accordance with claim 1 wherein the anode is silver, the electrolyte is monopotassium tetrasilver tetraiodide monocyanide and the cathode is 2 phenothiazine · 3I$_2$.

10. A solid state electrochemical cell in accordance with claim 1 wherein the anode is silver, the electrolyte is monopotassium tetrasilver tetraiodide monocyanide and the cathode is phenothiazine · $_2$.

11. A solid state electrochemical cell in accordance with claim 1 wherein the anode is silver, the electrolyte is monorubidium tetrasilver tetraiodide monocyanide and the cathode is 2 perylene · 3I$_2$.

12. A solid state electrochemical cell in accordance with claim 1 wherein the anode is silver, the electrolyte is monorubidium tetrasilver tetraiodide monocyanide and the cathode is perylene · I$_2$.

13. A solid state electrochemical cell in accordance with claim 1 wherein the electrolyte is monorubidium tetrasilver tetraiodide monocyanide and the cathode is 2 phenothiazine · 3I$_2$.

14. A solid state electrochemical cell in accordance with claim 1 wherein the anode is silver, the electrolyte is monorubidium tetrasilver tetraiodide monocyanide and the cathode is phenothiazine · I$_2$.

15. A solid state electrochemical cell in accordance with claim 1 wherein the anode is silver, the electrolyte is monopotassium monorubidium octosilver octoiodide dicyanide and the cathode is 2 perylene · 3I$_2$.

16. A solid state electrochemical cell in accordance with claim 1 wherein the anode is silver, the electrolyte is monocesium tetrasilver tetraiodide monocyanide and the cathode is 2 perylene · 3I$_2$.

17. A solid state electrochemical cell in accordance with claim 1 wherein the anode is copper, the electrolyte is monopotassium tetrasilver tetraiodide monocyanide and the cathode is 2 perylene · 3I$_2$.

18. A solid state electrochemical cell in accordance with claim 1 wherein the anode is silver, the electrolyte is monopotassium tetrasilver tetraiodide monocyanide and the cathode is rubidium triiodide.

19. A solid state electrochemical cell in accordance with claim 1 wherein the anode is silver, the electrolyte is monopotassium tetrasilver tetraiodide monocyanide and the cathode is tetramethylammonium triiodide.

* * * * *